(12) United States Patent
Kinzer et al.

(10) Patent No.: US 6,802,124 B2
(45) Date of Patent: Oct. 12, 2004

(54) UPHOLSTERY SUPPORT FOR THE BACK OF A VEHICLE SEAT

(75) Inventors: Andreas Kinzer, Homburg (DE); Heiko Utsch, Kaiserslautern (DE); Michael Wagner, St. Ingbert (DE); Markus Möller, Lauterecken (DE); Anja Zamel, Kaiserslautern (DE); Kai Gömann, Grünstadt (DE); Michael Böhmer, Rockenhausen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/233,890

(22) Filed: Sep. 3, 2002

(65) Prior Publication Data

US 2004/0041456 A1 Mar. 4, 2004

(30) Foreign Application Priority Data

Sep. 1, 2002 (DE) .......................................... 101 42 981

(51) Int. Cl.⁷ .............................................. B21D 53/88
(52) U.S. Cl. ...................... 29/897.2; 29/401.1; 29/428; 297/452.18
(58) Field of Search ............................. 29/91.1, 401.1, 29/897.2, 428; 297/452.18, 378.12

(56) References Cited

U.S. PATENT DOCUMENTS

| 4,246,734 | A | * | 1/1981 | Fogle et al. | 52/309.16 |
| 4,493,505 | A | * | 1/1985 | Yamawaki et al. | 296/63 |
| 5,567,017 | A | * | 10/1996 | Bourgeois et al. | 297/452.2 |
| 5,676,423 | A | * | 10/1997 | Pedronno et al. | 297/378.1 |
| 5,775,780 | A | * | 7/1998 | Murphy et al. | 297/473 |
| 5,782,537 | A | * | 7/1998 | Leistra et al. | 297/473 |
| 5,826,945 | A | * | 10/1998 | Siebler et al. | 297/452.18 |
| 5,984,419 | A | * | 11/1999 | Partington et al. | 297/473 |
| 6,260,924 | B1 | * | 7/2001 | Jones et al. | 297/452.18 |
| 6,491,346 | B1 | * | 12/2002 | Gupta et al. | 297/452.65 |
| 6,688,700 | B2 | * | 2/2004 | Gupta et al. | 297/452.18 |
| 6,739,673 | B2 | * | 5/2004 | Gupta et al. | 297/452.65 |

FOREIGN PATENT DOCUMENTS

DE 4402864 A1 8/1995

* cited by examiner

Primary Examiner—Essama Omgba
(74) Attorney, Agent, or Firm—Alston & Bird LLP

(57) ABSTRACT

In an upholstery support (11,21) for the back of a vehicle seat, in particular a backbench of an automobile, with a base plate (13,23) and at least one reinforcing frame (15,25) permanently connected to the base plate (13,23) and at least partially peripheral thereto, the reinforcing frame (15,25) is constructed modular.

12 Claims, 4 Drawing Sheets

# UPHOLSTERY SUPPORT FOR THE BACK OF A VEHICLE SEAT

BACKGROUND OF THE INVENTION

The present invention relates to an upholstery support for the back of a vehicle seat, in particular a backbench of an automobile.

DE 44 02 864 C2 discloses a known seat back upholstery support, which comprises a first flat sheet metal element as a base plate and a second sheet metal element, which is provided with a peripheral channel section. The costs of material and manufacture of this seat back upholstery support are quite high.

BRIEF SUMMARY OF THE INVENTION

One aspect of the present invention is the provision of an improved seat back upholstery support. In accordance with this aspect, the upholstery support includes at least one modular reinforcing frame that is at least partially positioned proximate the periphery of a base plate and is permanently connected to the base plate.

A modular construction of the reinforcing frame permits making with the same reinforcing frame different seat back upholstery supports, which meet with different requirements, for example, with respect to stiffness or geometric dimensions. This reduces the costs for tools and, thus, the costs of manufacture. To save material, the reinforcing frame is initially provided in a basic form, preferably only in sections of the base plate.

In the case of need, for example, when greater load absorptions are expected, additional reinforcing elements are joined to the reinforcing frame. For example, the additional reinforcing elements can result in a closed frame and/or produce a further possibility of force distribution in the longitudinal direction.

In the case of other geometric requirements, the basic form of the reinforcing frame may be divided at predetermined breaking points and rejoined in a different configuration. The additional cost in the assembly is negligible in view of the advantages of the modular construction. As parts to be separated, the legs of the reinforcing frame present themselves with a configuration that deviates from a straight-line shape. For example, the legs can have offset shapes. In this connection, the exchange of legs makes it possible to reinforce in a reliable manner seat back upholstery supports with different widths of the base plates. In a preferred construction of a divided seat back with a plurality of seat back upholstery supports, the legs to be replaced originate preferably from different reinforcing frames, i.e., an exchange occurs crosswise, so that the initial form of each reinforcing frame needs to include only a single, specially shaped leg.

Preferably, the modular construction of the reinforcing frame is supplemented with the possibility of selecting different hinge means for connecting the seat back upholstery support. Preferably, the hinge means are mounted to the reinforcing frame.

BRIEF DESCRIPTION OF THE SEVERAL VIEWS OF THE DRAWINGS

In the following, the invention is described in greater detail with reference to three embodiments illustrated in the drawings, in which.

DETAILED DESCRIPTION OF THE INVENTION

Figure 1:
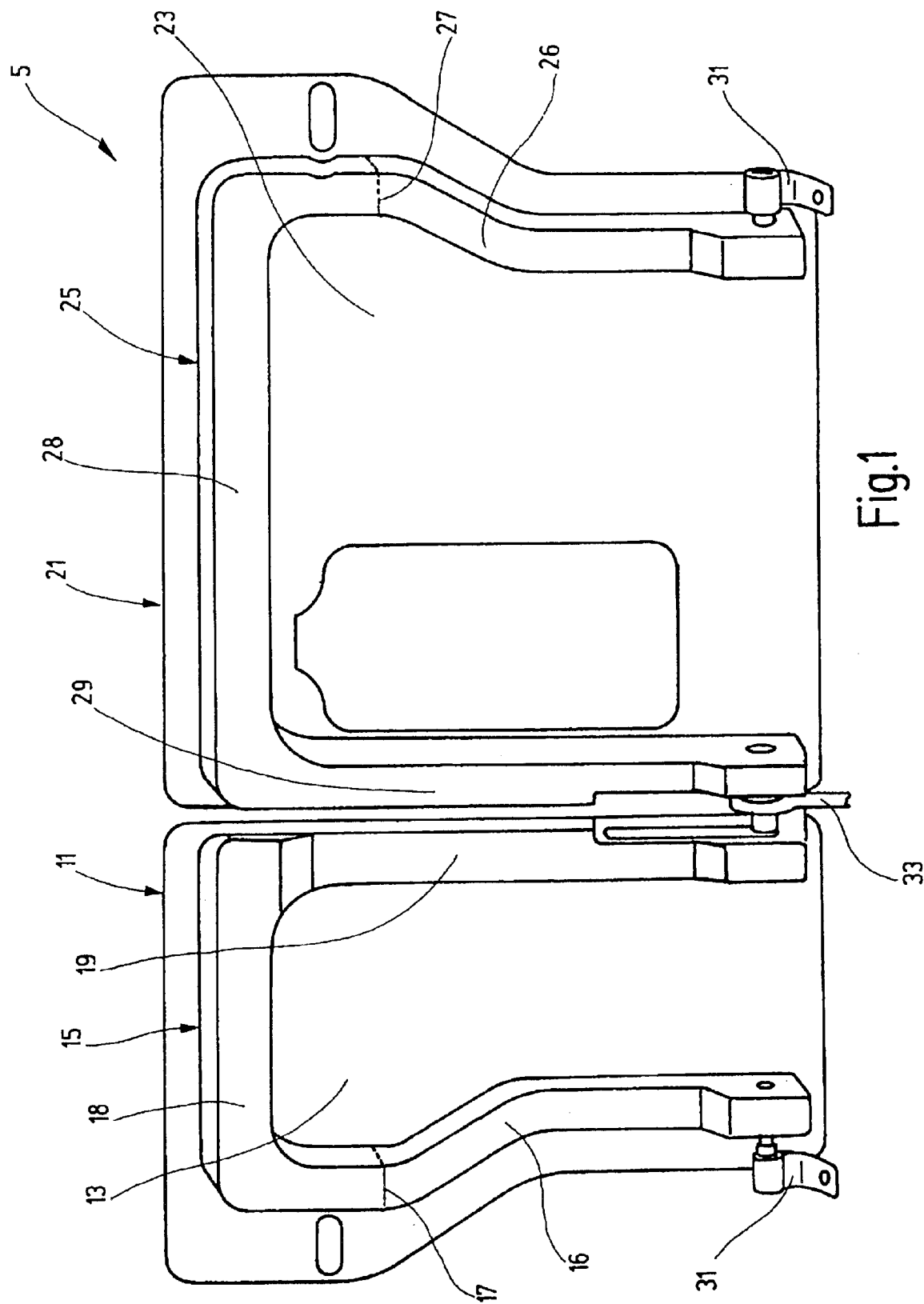
FIG. 1 is a perspective view of a first embodiment.
Figure 2:
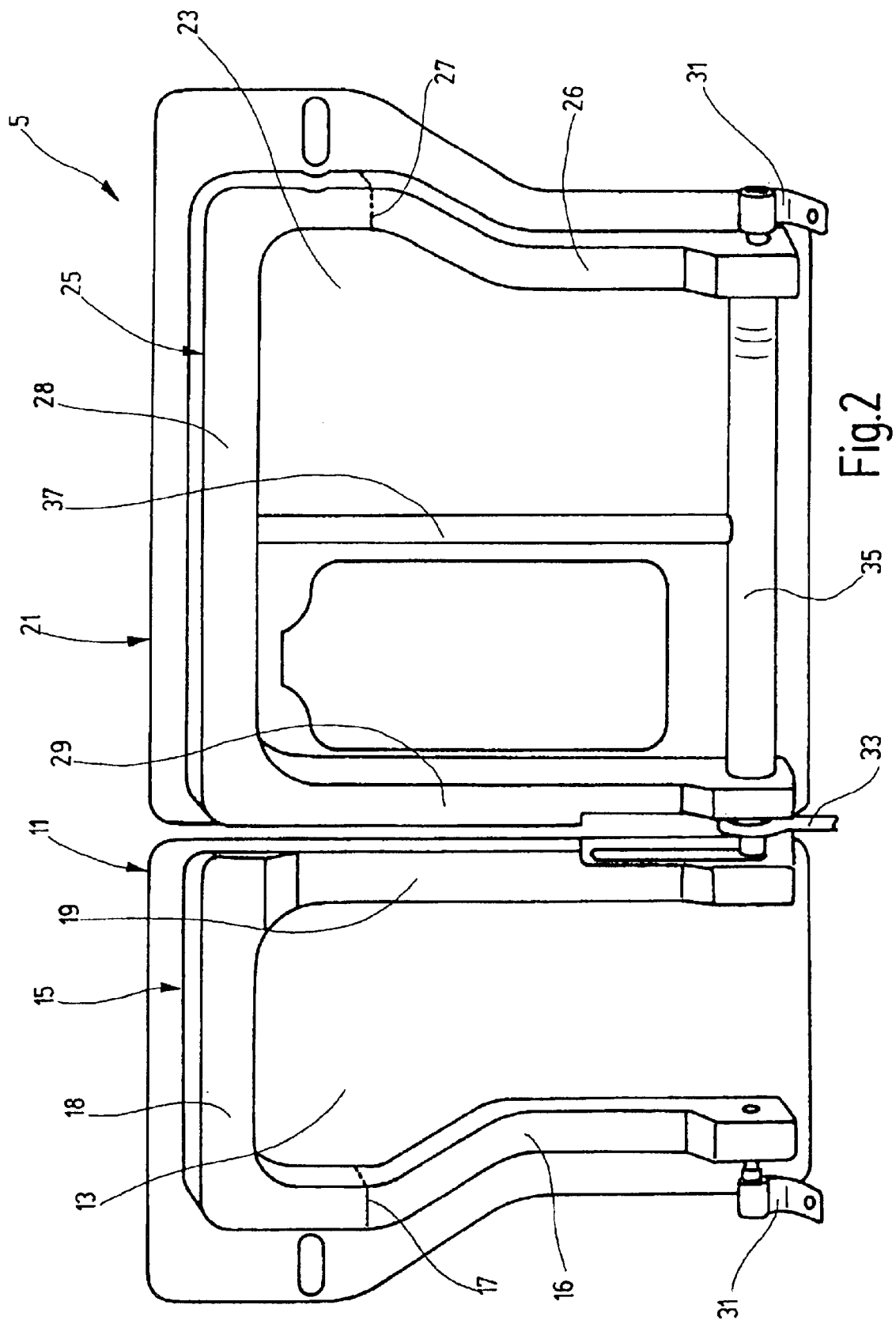
FIG. 2 is a perspective view of a second embodiment.
Figure 3:
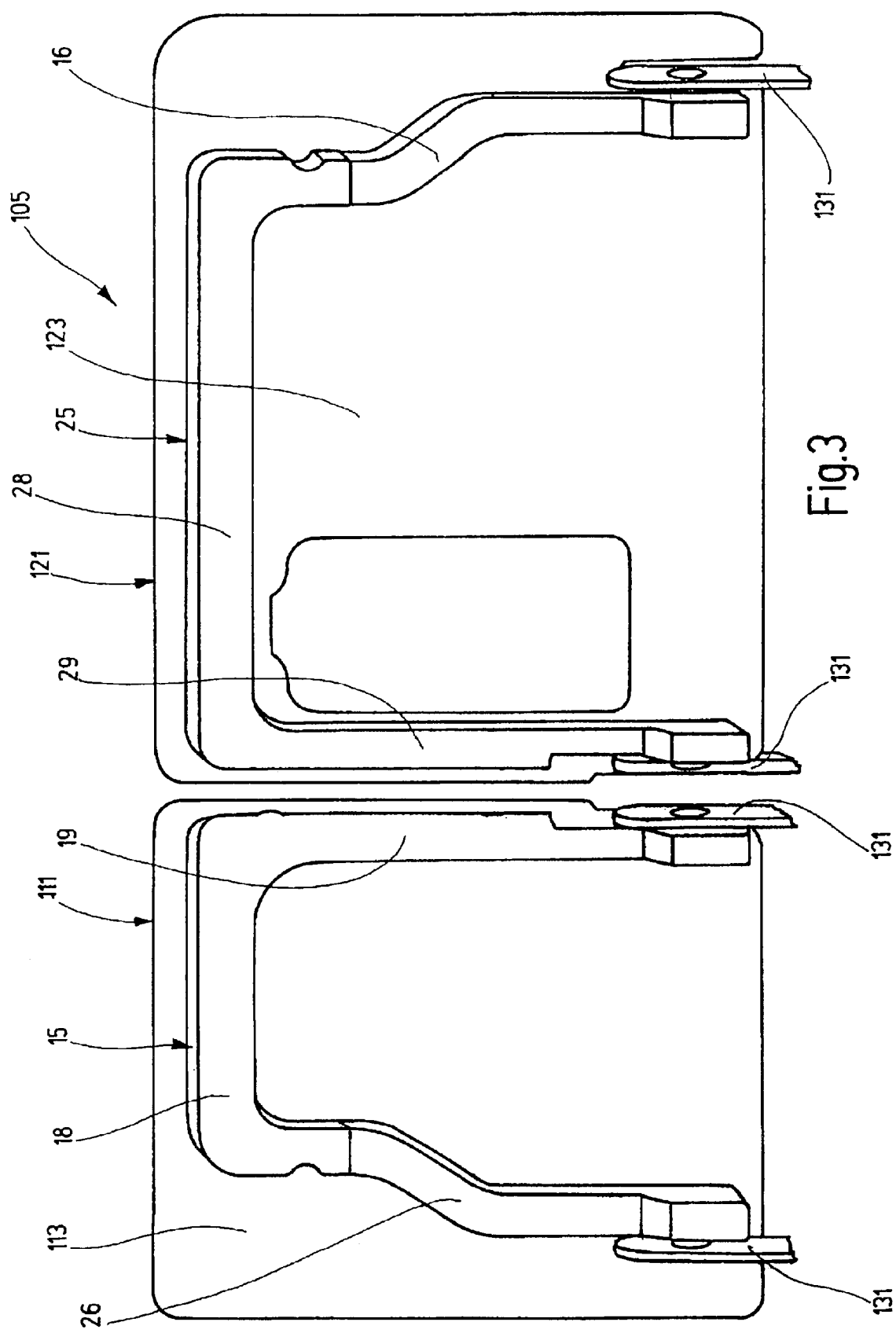
FIG. 3 is a perspective view of a third embodiment.
Figure 4:
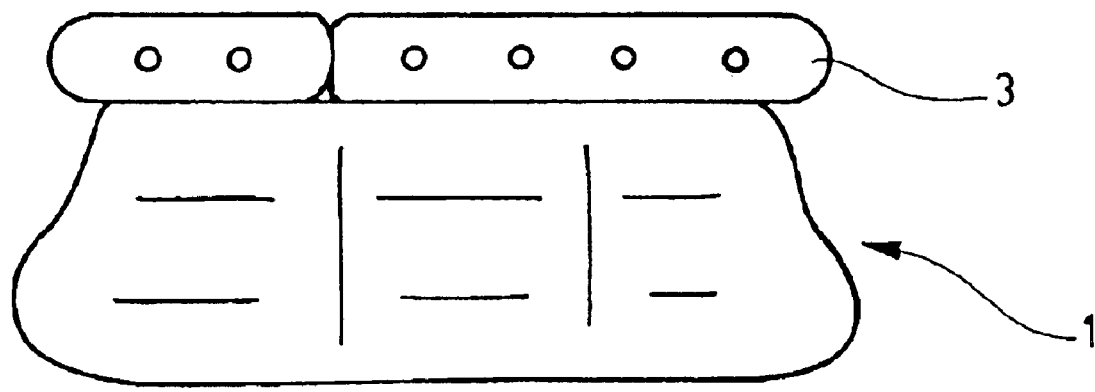
FIG. 4 is a schematic top view of a vehicle seat made in the form of a backbench with two seat back upholstery supports according to the invention.

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

A vehicle seat 1 is designed and constructed as a backbench for an automobile. The arrangement of the vehicle seat 1 in the automobile and the normal direction of travel thereof define the indications of direction used in the following. The vehicle seat 1 includes a pivotal back 3, which is divided in the transverse direction at a ratio of $\frac{1}{3}:\frac{2}{3}$, with the portions being constructed substantially identically. A group of seat back upholstery supports, generally indicated at 5, is provided as a structure of the seat back 3, which is described in the following with reference to a first embodiment.

A first seat back upholstery support 11 of the support group 5 for the one-third portion of seat back 3 comprises a first base plate 13 individual to the type of automobile, and a first reinforcing frame 15 with a channel section welded to the first base plate 13, while forming a hollow-section element. The reinforcing frame 15 extends with three legs along three edge regions of the first base plate 13, and leaves a lower edge region open. Below a breaking point 17, an outer leg 16 of reinforcing frame 15 extends inwardly offset along the outer edge of base plate 13, which is constructed in the way of a wheelbase. Otherwise, the outer leg 16 extends in the longitudinal direction of seat back 3. The upper and inner legs 18 and 19, respectively, are made straight, and extend respectively in the transverse and longitudinal directions of the seat back 3.

Accordingly, a second seat back upholstery support 21 of the support group 5 for the two-third portion of the seat back 3 comprises a second base plate 23 individual to the type of automobile, and a second reinforcing frame 25 welded to the second base plate 23, while forming a hollow-section element. This second reinforcing frame is made mirror-symmetric to the first reinforcing frame 15 with a greater dimension along the upper edge of the seat back, i.e. the upper edge region of the second upholstery support 21. An outer leg 26 is accordingly offset inward below a predetermined separation point 27.

Two outer joints 31 and one center joint 33 are arranged at the lower end of the outer legs 16 and 26, and between two inner legs 19 and 29 of the reinforcing frames 15 and 25, respectively. By means of these joints 31 and 33, the two seat back upholstery supports 11 and 21 are pivotally mounted, separately from each another, to the vehicle structure. In the present first embodiment, which is intended for a limousine, a three-point safety belt for the center seat is arranged with its upper mounting point, including its automatic belt system, directly on a locking plate and thus in the direct flux of force to the vehicle structure.

The second embodiment relates to a backbench of a station wagon, in which the first seat back upholstery support 11 is made identical with that of the first embodiment, whereas the second seat back upholstery support 21 mounts in addition the three-point safety belt for the center seat. The upper mounting point of the three-point safety belt, including the safety belt, is mounted on the upper leg of the second reinforcing frame 25. To be able to absorb the additionally introduced forces, the seat back upholstery support 21, which is otherwise made in the same way as that of the first embodiment, includes along its lower edge a transverse spar 35, for example, a torsion-resistant tubular section, which is welded to the outer leg 26 and inner leg 29 of the reinforcing frame 25 of the first embodiment, which is used as basic form. Together with transverse spar 35, the reinforcing frame 25 forms a strong peripheral frame. Furthermore, the second seat back upholstery support 21 includes a center spar 37, for example, likewise a tubular section, which extends from approximately the center of transverse spar 35 to an upper leg 28 of reinforcing frame 25 and is welded to these two components. The upper leg 28 may include a receptacle for the center spar 37.

The third embodiment, which relates to a backbench with a self-supporting back, includes a group 105 of seat back upholstery supports. This group comprises a first upholstery support 111 with a first base plate 113 and a second upholstery support 121 with a second base plate 123. In accordance with the invention, the base plates 113 and 123 are reinforced by means of the two reinforcing frames 15 and 25 of the foregoing embodiments, which are modified, as described in the following, in the way of a modular construction.

The two reinforcing frames 15 and 25 of the first embodiment, which are preferably used collectively as a basic form, are separated at predetermined breaking points 17 and 27. The separated outer legs 16 and 26 are exchanged, so that an outward offset is obtained on each side, i.e., a greater width in the transverse direction. When being welded to the base plates 113 and 123, the outer legs 16 and 26 are simultaneously welded to the upper legs 28 and 18 of reinforcing frames 25 and 15. The lower end of all outer and inner legs 26 and 16, and 19 and 29, respectively, mount each the upper portion of a locking means, the lower portion of which is permanently connected to the vehicle structure. By means of their two locking means 131, the two seat back upholstery supports 111 and 121 can be pivoted independently of each other, and be adjusted in their inclination. As a result, there is no need to join the upper edge of the seat back to the vehicle structure.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of forming upholstery supports, comprising:
    providing a plurality of basic forms, wherein for each basic form, the basic form includes at least two sections, with one of the sections being a reference section and the other of the sections being an offset leg that extends substantially in a longitudinal direction, and the offset leg is offset in a transverse direction, and wherein the longitudinal and transverse directions are perpendicular to one another;
    separating an offset leg of a first basic form of the plurality of basic forms from a reference section of the first basic form;
    separating an offset leg of a second basic form of the plurality of basic forms from a reference section of the second basic form;
    forming a first reinforcing frame, which is different from the first and second basic forms, by mounting the separated offset leg of the second basic form to the reference section of the first basic form; and
    forming a second reinforcing frame, which is different from the first and second basic forms, by mounting the separated offset leg of the first basic form to the reference section of the second basic form.

2. A method of forming upholstery supports according to claim 1, wherein the separating of the offset leg of the first basic form, the separating of the offset leg of the second basic form, the forming of the first reinforcing frame, and the forming of the first reinforcing frame are carried out so that:
    the first basic form defines a different width than the first reinforcing frame, and
    the second basic form defines a different width that the second reinforcing frame.

3. A method of forming upholstery supports according to claim 1, wherein:
    separating the offset leg of the first basic form from the reference section of the first basic form includes separating the offset leg of the first basic form from the reference section of the first basic form at a predetermined breaking point of the first basic form; and
    separating the offset leg of the second basic form from the reference section of the second basic form includes separating the offset leg of the second basic form from the reference section of the second basic form at a predetermined breaking point of the second basic form.

4. A method of forming upholstery supports according to claim 3, wherein:
    the predetermined separation point of the first basic form is a first predetermined breaking line; and
    the predetermined separation point of the second basic form is second predetermined breaking line.

5. A method of forming upholstery supports according to claim 1, wherein:
    the forming a first reinforcing frame includes forming a first upholstery support by permanently connecting the first reinforcing frame to a first base plate so that the first reinforcing frame is positioned proximate a periphery of the first base plate; and
    the forming a second reinforcing frame includes forming a second upholstery support by permanently connecting the second reinforcing frame to a second base plate so that the second reinforcing frame is positioned proximate a periphery of the second base plate.

6. A method of forming upholstery supports according to claim 5, further comprising mounting hinges, which are for mounting the upholstery supports to a vehicle, to the first and second upholstery supports.

7. A method of forming upholstery supports according to claim 5, further comprising mounting at least one reinforcing spar to the first reinforcing frame.

8. A method of forming upholstery supports according to claim 5, wherein:

a third basic form of the plurality of basic forms is substantially similar to the first basic form; and the method further comprises forming a third upholstery support by permanently connecting the third basic form to a third base plate so that the third basic form is positioned proximate a periphery of the third base plate, without separating the offset leg and the reference section of the third basic form from one another.

9. A method of forming upholstery supports according to claim 1, wherein:

in an overall view of the first basic form prior to the separating of the offset leg of the first basic form the reference section of the first basic form, the offset leg of the first basic form is in an inwardly offset configuration with respect to the reference section of the first basic firm;

in an overall view of the second basic form prior to the separating of the offset leg of the second basic form the reference section of the second basic form, the offset leg of the second basic form is in an inwardly offset configuration with respect to the reference section of the second basic form;

in an overall view of the first reinforcing frame subsequent to the forming of the first reinforcing frame, the offset leg of the second basic form is in an outwardly offset configuration with respect to the reference section of the first basic form; and in an overall view of the second reinforcing frame subsequent to the forming of the second reinforcing frame, the offset leg of the first basic form is in an outwardly offset configuration with respect to the reference section of the second basic form.

10. A method of forming upholstery supports according to claim 9, wherein:

the first basic form generally defines an inverted U-shape in said overall view of the first basic form;

the second basic form generally defines an inverted U-shape in said overall view of the second basic form;

the first reinforcing frame form generally defines an inverted U-shape in said overall view of first reinforcing frame; and the second reinforcing frame form generally defines an inverted U-shape in said overall view of the second reinforcing frame.

11. A method of forming upholstery supports according to claim 9, wherein:

the separating of the offset leg of the first basic form from the reference section of the first basic form includes separating the offset leg of the first basic form from the reference section of the first basic form at a predetermined separation point of the first basic form; and the separating of the offset leg of the second basic form from the reference section of the second basic form includes separating the offset leg of the second basic form from the reference section of the second basic form at a predetermined separation point of the second basic form.

12. A method of forming upholstery supports according to claim 11, wherein:

the predetermined separation point of the first basic form is a first predetermined breaking line; and the predetermined separation point of the second basic form is second predetermined breaking line.

* * * * *